United States Patent
Husmann (10) Patent No.: US 11,608,247 B2
(45) Date of Patent: Mar. 21, 2023

(54) CALIPER BRAKE FOR AN ELEVATOR SYSTEM USED AS A HOLDING AND SAFETY BRAKE

(71) Applicant: Inventio AG, Hergiswil (CH)

(72) Inventor: Josef Husmann, Lucerne (CH)

(73) Assignee: INVENTIO AG, Hergiswil (CH)

( * ) Notice: Subject to any disclaimer, the term of this patent is extended or adjusted under 35 U.S.C. 154(b) by 204 days.

(21) Appl. No.: 16/958,174

(22) PCT Filed: Mar. 26, 2019

(86) PCT No.: PCT/EP2019/057486
§ 371 (c)(1),
(2) Date: Jun. 26, 2020

(87) PCT Pub. No.: WO2019/185569
PCT Pub. Date: Oct. 3, 2019

(65) Prior Publication Data
US 2021/0002102 A1    Jan. 7, 2021

(30) Foreign Application Priority Data
Mar. 28, 2018  (EP) .................................... 18164470

(51) Int. Cl.
*B66B 5/18*   (2006.01)
*B66B 17/34*  (2006.01)
*F16D 65/38*  (2006.01)

(52) U.S. Cl.
CPC ............... *B66B 5/18* (2013.01); *B66B 17/34* (2013.01); *F16D 2065/383* (2013.01)

(58) Field of Classification Search
CPC ...... B66B 17/34; B66B 5/18; F16D 2065/383
See application file for complete search history.

(56) References Cited

U.S. PATENT DOCUMENTS 4,592,451 A    6/1986  Persson
5,159,995 A   11/1992  Sissala et al.
(Continued)

FOREIGN PATENT DOCUMENTS

CH        707833 A1 *  9/2014  ............... B66B 5/18
CN      105358462 A    2/2016
(Continued)

OTHER PUBLICATIONS

English Machine Translation of CH 707833 A1.*

*Primary Examiner* — Diem M Tran
(74) *Attorney, Agent, or Firm* — William J. Clemens; Shumaker, Loop & Kendrick, LLP (57) ABSTRACT

An elevator system caliper brake includes first and second brake levers each with a brake pad wherein the brake levers move the brake pads relative to one another along an actuation axis. The first brake lever is rotatably mounted at a stationary first mounting point at a housing of the brake, and the second brake lever is rotatably mounted at a second mounting point on an intermediate lever that is rotatably mounted at the brake housing. A tension element can be moved approximately parallel to an actuation axis and is connected to the brake levers at mounting points between the respective brake pads and the brake lever mounting points. A closing spring moves the first and second brake levers to decrease the distance between the brake pads and a linear spindle drive connected to the intermediate lever selectively counteracts the closing spring to increase the distance between the brake pads.

15 Claims, 5 Drawing Sheets

(56) References Cited

U.S. PATENT DOCUMENTS

| | | | |
|---|---|---|---|
| 5,803,211 A * | 9/1998 | Wilke | F16D 59/02 |
| | | | 188/173 |
| 6,318,505 B1 | 11/2001 | De Angelis | |
| 8,157,060 B2 | 4/2012 | Gremaud et al. | |
| 10,442,662 B2 | 10/2019 | Husmann | |
| 2016/0355377 A1 | 12/2016 | Husmann | |
| 2017/0036888 A1 | 2/2017 | Ladner et al. | |
| 2020/0207575 A1 * | 7/2020 | Koskinen | B66B 5/18 |

FOREIGN PATENT DOCUMENTS

| | | | | |
|---|---|---|---|---|
| CN | 105829229 | A | 8/2016 | |
| CN | 106429937 | A | 2/2017 | |
| CN | 206328087 | U | 7/2017 | |
| CN | 207030826 | U | 2/2018 | |
| CN | 106429937 | B | 10/2020 | |
| EP | 1067084 | A1 | 1/2001 | |
| EP | 1671912 | A1 | 6/2006 | |
| EP | 1862419 | A1 | 12/2007 | |
| EP | 3127848 | A1 | 2/2017 | |
| EP | 3127848 | B1 | 12/2018 | |
| JP | 2006206217 | A | 8/2006 | |
| JP | 4520319 | B2 | 8/2010 | |
| WO | 2012110273 | A1 | 8/2012 | |
| WO | 2015052109 | A1 | 4/2015 | |
| WO | 2015058663 | A1 | 4/2015 | |
| WO | 2015090726 | A1 | 6/2015 | |
| WO | WO-2018109020 | A1 * | 6/2018 | B66B 1/36 |

* cited by examiner

CALIPER BRAKE FOR AN ELEVATOR SYSTEM USED AS A HOLDING AND SAFETY BRAKE

FIELD

The invention relates to a caliper brake for an elevator system. The elevator system may comprise one or more elevator cars. The invention is particularly suitable for an elevator system with multiple elevator cars that preferably are movable individually. The invention particularly relates to a caliper brake for an elevator system, wherein the caliper brake simultaneously serves as a holding brake and a safety brake.

BACKGROUND

One or more caliper brakes may be used in an elevator system. If the caliper brake serves as a holding brake, for example, it can hold the elevator car during a stop on a floor such that passengers particularly are able to safely enter and exit. To this end, the caliper brake is during a stop controlled in such a way that the caliper brake initially is closed and subsequently opened again. If the caliper brake serves as a safety brake, for example, it can decelerate and secure the elevator car in the elevator shaft in case of a defect or an emergency. If the caliper brake serves as a holding brake and as a safety brake, the holding function and the safety function for an elevator car can be realized with a single caliper brake.

WO 2015/090726 A1 discloses a caliper brake for elevator systems. The known caliper brake comprises two brake calipers, which respectively are connected to brake linings on one end and to a force application point at coupling points on the other end. A pivotal point is provided for each of the brake calipers between their brake lining and their coupling point and respectively connected to a brake housing in a rigid manner. The respective brake caliper can be pivoted into a standby position and into a braking position. A brake arm of the respective brake caliper extending from the brake lining to the coupling point preferably is respectively realized in the form of a leaf spring.

EP 1 067 084 A1 discloses an elevator car braking device for a passenger or freight elevator. The known elevator car braking device consists of a cuboid housing, a brake caliper support with two brake caliper hinge pins fixed therein, the brake calipers and brake lining carriers, the brake linings, a toggle lever mechanism, a lifting mechanism in the form of a linear spindle motor and a pressure spring. The holding effect of the known elevator car braking device is achieved in that the pressure spring spreads the driving levers of the brake calipers, which can be pivoted about the brake caliper hinge pins, via the toggle lever mechanism and thereby presses their lever on the brake side with the brake linings against running surfaces of the guide rail. The elevator car braking device is released in that the controllable lifting mechanism overcomes the pretensioning force of the pressure spring and transfers the toggle lever mechanism into the bent position such that the brake calipers are released and the brake linings are sufficiently spaced apart from the guide rail.

SUMMARY

The invention is based on the objective of disclosing a caliper brake that allows an improved functionality. The invention particularly aims to disclose a caliper brake that al-lows an improved response behavior, especially a short closing time. This would make it possible, in particular, to keep the closing time as short as possible in case of an emergency. The invention furthermore aims to disclose an elevator system with such a caliper brake.

The following description discloses corresponding design solutions and proposals, which concern a caliper brake and an elevator system with a caliper brake and attain at least parts of the above-defined objective. Furthermore, advantageous supplementary or alternative enhancements and designs are respectively disclosed or described.

One solution concerns a caliper brake for an elevator system, which is used in particular as a holding and safety brake, wherein a first brake lever and a second brake lever are provided, wherein a first brake pad is attached to a brake pad end of the first brake lever, wherein a second brake pad is attached to a brake pad end of the second brake lever, wherein the first brake lever is mounted at a first mounting point, wherein the second brake lever is mounted at a second mounting point, wherein the first brake pad and the second brake pad can be moved relative to one another along an actuation axis by means of the first brake lever and the second brake lever, and wherein at least one tension element is provided and can be moved at least approximately parallel to the actuation axis. A distance between the first tension element mounting point and the second tension element mounting point along the actuation axis, which is defined by the tension element, remains constant in this case. The first brake lever is connected to the tension element between its brake pad end and the first mounting point at a first tension element mounting point and the second brake lever is connected to the tension element between its brake pad end and the second mounting point at a second tension element mounting point.

Another solution concerns a caliper brake for an elevator system, which is used in particular as a holding and safety brake, wherein a first brake lever and a second brake lever are provided, wherein a first brake pad is attached to a brake pad end of the first brake lever, wherein a second brake pad is attached to a brake pad end of the second brake lever, wherein the first brake lever is mounted at a first mounting point, wherein the second brake lever is mounted at a second mounting point, wherein the first brake pad and the second brake pad can be moved relative to one another along an actuation axis by means of the first brake lever and the second brake lever, wherein a linear spindle drive is provided and makes it possible to move the first brake lever and the second brake lever relative to one another in order to change a distance between the first brake pad and the second brake pad along the actuation axis, wherein at least one closing spring is provided and at least indirectly moves the first brake lever and the second brake lever relative to one another in order to decrease the distance between the first brake pad and the second brake pad, and wherein the linear spindle drive counteracts the closing spring in order to increase the distance between the first brake pad and the second brake pad.

The tension element can have a suitable design. It would be conceivable, in principle, that the tension element defines a common rotational axis for the first brake lever and for the second brake lever, wherein the tension element and therefore also such an axis can be moved at least approximately parallel to the actuation axis. However, the tension element preferably is realized in the form of a draw shackle, wherein separate rotational axes are advantageously defined for the first brake lever and the second brake lever. Consequently, the first tension element mounting point and the second tension element mounting point preferably do not coincide. The draw shackle defines a distance between the first tension element mounting point and the second tension element mounting point along the actuation axis, i.e. in the spatial dimension defined by the actuation axis. No distances preferably are defined between the first tension element mounting point and the second tension element mounting point in the other two spatial dimensions extending perpendicular to the actuation axis. The draw shackle is moved parallel to the actuation axis during an actuation of the caliper brake, wherein a distance between the first tension element mounting point and the second tension element mounting point along the actuation axis, which is defined by the draw shackle, remains constant in this case. The first tension element mounting point is then realized in the form of a first draw shackle mounting point, which is defined by the draw shackle, and the second tension element mounting point is realized in the form of a second draw shackle mounting point, which is defined by the draw shackle. The mounting can therefore be realized in a floating manner such that a small ventilation clearance for each of the brake pads can be achieved. This makes it possible to quickly close the brake without the risk of dragging in the open state.

It is advantageous to provide a closing spring that at least indirectly moves the first brake lever and the second brake lever relative to one another in order to decrease the distance between the first brake pad and the second brake pad along the actuation axis, wherein the closing spring is arranged between the first brake lever and the second brake lever. Such an arrangement particularly can be realized due to the design of the at least one tension element in the form of a draw shackle. It is advantageous that two draw shackles may also be provided in this case. The brake levers may then be advantageously arranged between an upper and a lower draw shackle. This essentially prevents bending forces from acting upon the draw shackles. Furthermore, the closing spring and/or a spring mounting for the closing spring may also be arranged between the two draw shackles. The arrangement of the closing spring and optionally also a spring mounting between the first brake lever and the second brake lever results in a compact design and also provides advantages with respect to the effect of the spring force of the closing spring.

It is also advantageous that the first mounting point is arranged stationary with respect to a housing part, that an intermediate lever is provided and mounted at an intermediate lever mounting point, that the intermediate lever mounting point is arranged stationary with respect to the housing part, that the second brake lever is mounted on the intermediate lever at the second mounting point, and that the second mounting point can be moved relative to the housing part during a rotation of the intermediate lever about the intermediate lever mounting point. Consequently, the second mounting point initially can be moved relative to the housing part via the intermediate lever in order to open and close the caliper brake. Since the mounting is realized in a floating manner, the caliper brake can be advantageously closed in that the two brake pads are pressed against one another on braking tracks, which preferably are realized on a suitable rail. In this case, the caliper brake is closed by the spring force of the closing spring such that a safety function is also realized in case of a motor failure. The brake therefore closes and also remains closed for a long period of time during a power outage.

A decisive element of the floating mounting preferably is formed by the respective tension element or draw shackle mounted in the housing. The tension element is arranged in the housing in a floating manner in this case. In an embodiment, braking forces generated by pressing the brake pads against the braking tracks can be introduced into the housing via the tension element. This type of floating mounting, in which the brake levers are mounted on the end of the housing facing away from the brake pad and the tension element mounting points are realized in a floating manner relative to the housing, makes it possible to keep lateral forces required for tracking the brake pads at a short distance from the braking tracks at a low level.

It is therefore also advantageous that the closing spring, which at least indirectly moves the first brake lever and the second brake lever relative to one another in order to decrease a distance between the first brake pad and the second brake pad along the actuation axis, at least indirectly acts upon the intermediate lever with a closing force. If an indirect action is realized, this can be advantageously achieved by means of a spring mounting. In this case, it is advantageous to design the spring mounting in such a way that the intermediate lever is still acted upon with a sufficiently high closing force even if a spring fracture occurs and that the spring mounting is on the one hand supported on a housing of the caliper brake and on the other hand connected to the intermediate lever. For example, approximately 75% of the braking force may remain if a spring fracture occurs, i.e. if a coil of the spring fails. The closing spring may be pretensioned, for example, to approximately 75% of the maximum force such that the braking force remains constant and a long service life is achieved.

It is advantageous that the first brake pad is attached to the brake pad end of the first brake lever so as to be rotatable about at least one axis. It is additionally or alternatively advantageous that the second brake pad is attached to the brake pad end of the second brake lever so as to be rotatable about at least one axis. However, a different mounting that allows an alignment of the brake pads relative to the braking tracks would also be conceivable.

The size of the ventilation clearance affects the response behavior of the caliper brake. In this context, a larger ventilation clearance makes it necessary to move the brake pads over a greater distance until they abut on the braking tracks and generate the braking force. Larger ventilation clearances, for example, of up to 7 mm may be necessary for rapidly moving elevator cars of conventional elevator systems in order to prevent the brake from dragging while the elevator cars are in motion. It is in fact conceivable to movably fasten brakes on the elevator car with a small ventilation clearance and to separately guide the brakes on the rail, but the corresponding effort is significant and it was determined that dragging of the brake still cannot be reliably prevented.

In contrast, an advantageous reduction of the ventilation clearance can be achieved by guiding the brake pads on their braking tracks. To this end, suitable elastic elements may be provided and pretensioned when the brake is open in order to achieve a sound guidance. It is especially advantageous that such a pretensioning elements are realized in the form of pretensioning rollers. It is therefore advantageous that at least one pretensioning roller is provided for the first brake pad and during the operation ensures a ventilation clearance between the first brake pad and a braking track for the first brake pad in the open state and/or that at least one pretensioning roller is provided for the second brake pad and during the operation ensures a ventilation clearance between the second brake pad and a braking track for the second brake pad in the open state. In this context, it is particularly advantageous that the pretensioning roller for the first brake pad has an elastic roller coating and that the elastic roller coating is during the operation pretensioned relative to the braking track for the first brake pad in the open state. It is furthermore advantageous that the pretensioning roller for the second brake pad has an elastic roller coating and that the elastic roller coating is during the operation pretensioned relative to the braking track for the second brake pad in the open state. Dragging is thereby prevented and a sound guidance can be achieved. A ventilation clearance of approximately 0.25 mm relative to the rail particularly can be realized on each of the brake pads when the caliper brake is open. This in turn has the advantageous effect that the lateral forces for tracking the brake pads at a short distance from the braking track can be maintained at a low level.

It is advantageous that the linear spindle drive comprises a motor and a threaded spindle, that the motor at least indirectly acts upon the first brake lever and the second brake lever via the threaded spindle when the motor counteracts the closing spring in order to increase the distance between the first brake pad and the second brake pad, and that the threaded spindle is realized in such a way that no self-locking effect occurs on the threaded spindle. The motor can be rotatably mounted on the housing in this case. The threaded spindle can be connected to the intermediate lever. It is especially advantageous if the threaded spindle is realized in the form of a ball screw spindle. A ball screw nut of the ball screw spindle can then be rotatably connected to the intermediate lever. The thread of the threaded spindle has a sufficiently high pitch for ensuring that no self-locking effect occurs. The spring force of the closing spring, a resulting lever transmission and the thread pitch of the threaded spindle define the motor size, which preferably is chosen as small as possible. The motor drives the threaded spindle in order to open the brake. When the motor is switched off, the closing spring therefore can decrease the distance between the first brake pad and the second brake pad due to the lacking self-locking effect in order to press these brake pads against the braking tracks.

The motor therefore can advantageously act upon the intermediate lever by means of the threaded spindle when the motor counteracts the closing spring in order to increase the distance between the first brake pad and the second brake pad. In this case, the closing spring can on the one hand be at least indirectly supported on the housing and on the other hand at least indirectly connected to the intermediate lever, wherein this can be achieved, for example, by means of the spring mounting.

In a potential embodiment, the threaded spindle may be connected to the intermediate lever by a linear freewheel. In this particular embodiment, the motor therefore can be primarily decelerated due to friction. This represents an option for preventing an abrupt deceleration of the motor, according to which the threaded spindle is decoupled from the intermediate lever by the linear freewheel and a deceleration of the motor primarily takes place as a result of friction.

It is also advantageous that the motor is connected to the threaded spindle by means of a freewheel or by means of a switchable clutch. During closing of the brake, the motor may be switched off and driven by the closing spring via the intermediate lever and the threaded spindle such that the brake is closed. Once the brake is closed, the threaded spindle is abruptly decelerated and the motor is decoupled by the freewheel. The motor may continue to run due to its inertia and is subsequently decelerated as a result of friction. However, a switchable clutch may also be arranged between the motor and the threaded spindle instead of the freewheel. This solution may optionally make it possible to achieve a shorter closing time.

The nominal torque of the motor may, if applicable, also be significantly exceeded because opening of the caliper brake may only take fractions of a second. A certain torque is required for holding open the brake. In a potential embodiment, the motor is dimensioned in such a way that it can permanently generate the required torque and therefore permanently hold the caliper brake in the open state. In another advantageous embodiment, it is also possible to provide a holding brake for the motor, by means of which the motor is during the operation at least partially relieved in an open state of the caliper brake. The motor particularly may be completely relieved when the holding brake is activated.

It is advantageous to realize the linear spindle drive in such a way that the distance between the first brake pad and the second brake pad is readjusted in accordance with the attrition of the brake linings of the first brake pad and the second brake pad, and that the linear spindle drive at least indirectly actuates an attrition indicator switch once a predefined attrition of the brake linings is reached. An absolute rotational position of the threaded spindle may shift as the attrition progresses. The attrition can be monitored by means of the attrition indicator switch. Once the predefined attrition of the brake linings is reached, the elevator can be shut down or a corresponding service can be requested.

The motor may carry out a certain number of revolutions and then come to a standstill in order to open the brake. In this way, the same ventilation clearance can always be achieved on the brake pads. It is therefore advantageous to realize the linear spindle drive in such a way that an increase of the distance between the first brake pad and the second brake pad from a closed state into an open state at least approximately takes place with a predefined number of revolutions. This number of revolutions may or may not be an integral number.

The caliper brake therefore can fulfill a safety function and a holding function depending on its design and specific application. This means that a fully loaded elevator car with overspeed can be brought to a standstill. In order to keep the failure probability of a brake system for the elevator car sufficiently low, the remaining brakes bring the elevator car to a standstill if one of the brakes fails. Multiple brakes may be provided on the elevator car in such an embodiment, wherein at least one of said brakes is realized in accordance with a proposed embodiment.

A suitable design of the caliper brake makes it possible to realize closing and opening times in the range between 0.1 and 0.3 seconds. In this context, dragging of the brake with a correspondingly small ventilation clearance can also be prevented while the elevator car is in motion. Furthermore, noises generated when the brake is closed and opened can be limited to such a degree that they do not amount to more than 60 dBA. In addition, a mass (weight) of the brake may not exceed 10 kg for a specified braking force of 10 kN. It is furthermore possible to realize a brake that can carry out 10 million braking cycles. The brake linings of the brake pads may be realized in such a way that an exchange is required at the earliest after 2000 dynamic braking maneuvers.

The caliper brake especially can be used as a brake for self-propelled elevator cars or for elevator cars that can be decoupled from load bearing means, wherein the caliper brake is arranged on the elevator car. Such a caliper brake can also be directly mounted on the elevator car in other elevator systems that operate with load bearing means in the form of cables or belts, e.g., in order to prevent lowering of the elevator car while it is loaded and/or to relieve the load bearing means and the drive from safety functions.

Preferred exemplary embodiments of the invention are described in greater detail below with reference to the attached drawings.

DETAILED DESCRIPTION

Figure 1:
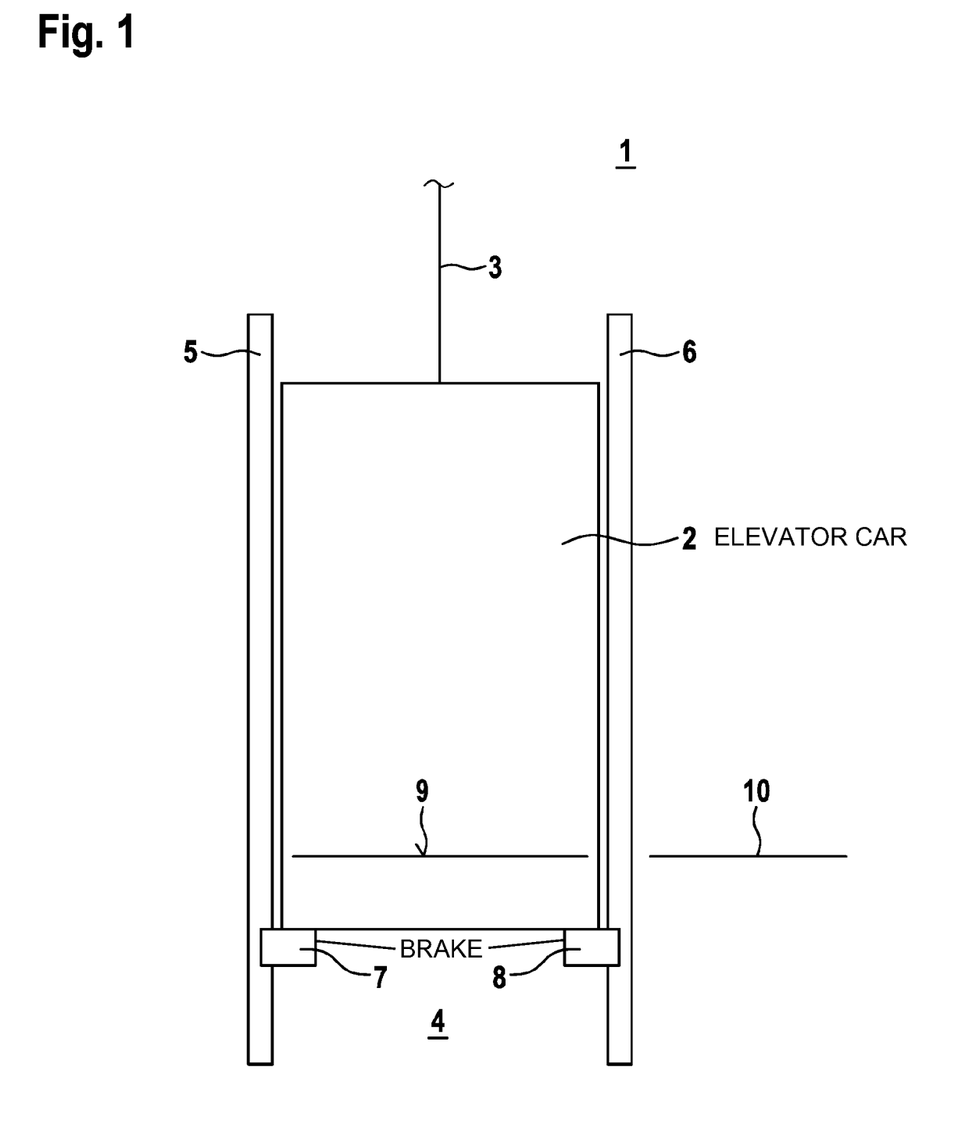
FIG. 1 shows a schematic representation of an elevator system according to a potential embodiment of the invention.

FIG. 1 shows a schematic representation of an elevator system 1 according to a potential embodiment of the invention. The elevator system 1 comprises an elevator car 2 that can be moved in an elevator shaft 4 on suitable load bearing means or device 3. Rails 5, 6, furthermore are arranged in the elevator shaft 4. The rails 5, 6 at least serve as brake rails 5, 6. However, the rails 5, 6 may also serve as guide rails 5, 6. Brakes 7, 8 are arranged on the elevator car 2. In this case, the brake 7 interacts with the rail 5. The brake 8 interacts with the rail 6. At least one of the brakes 7, 8 is realized in the form of a caliper brake 7, 8. Potential designs of the brake 7 in the form of a caliper brake 7 are described below with reference to FIGS. 2 to 5. The brake 8 may be accordingly realized in the form of a caliper brake 8. Furthermore, the rail 6 may be realized in accordance with the rail 5.

The brakes 7, 8 may be advantageously used as holding brakes 7, 8. For example, the elevator car 2 may stop on a floor, wherein a floor 9 of the elevator car 2 should be aligned at a schematically indicated exit height 10. Since the load conditions of the elevator car 2 change when it is loaded and unloaded or when passengers enter and exit the elevator car, it is advantageous to close the brakes 7, 8 while the elevator car is loaded and unloaded or while passengers enter and exit the elevator car after the alignment of the floor 9 at the exit height 10. Furthermore, the brakes 7, 8 may also be used as safety brakes 7, 8 that reliably secure the elevator car 2 in the elevator shaft 4 in case of a malfunction and also in case of a power outage.

Figure 2:
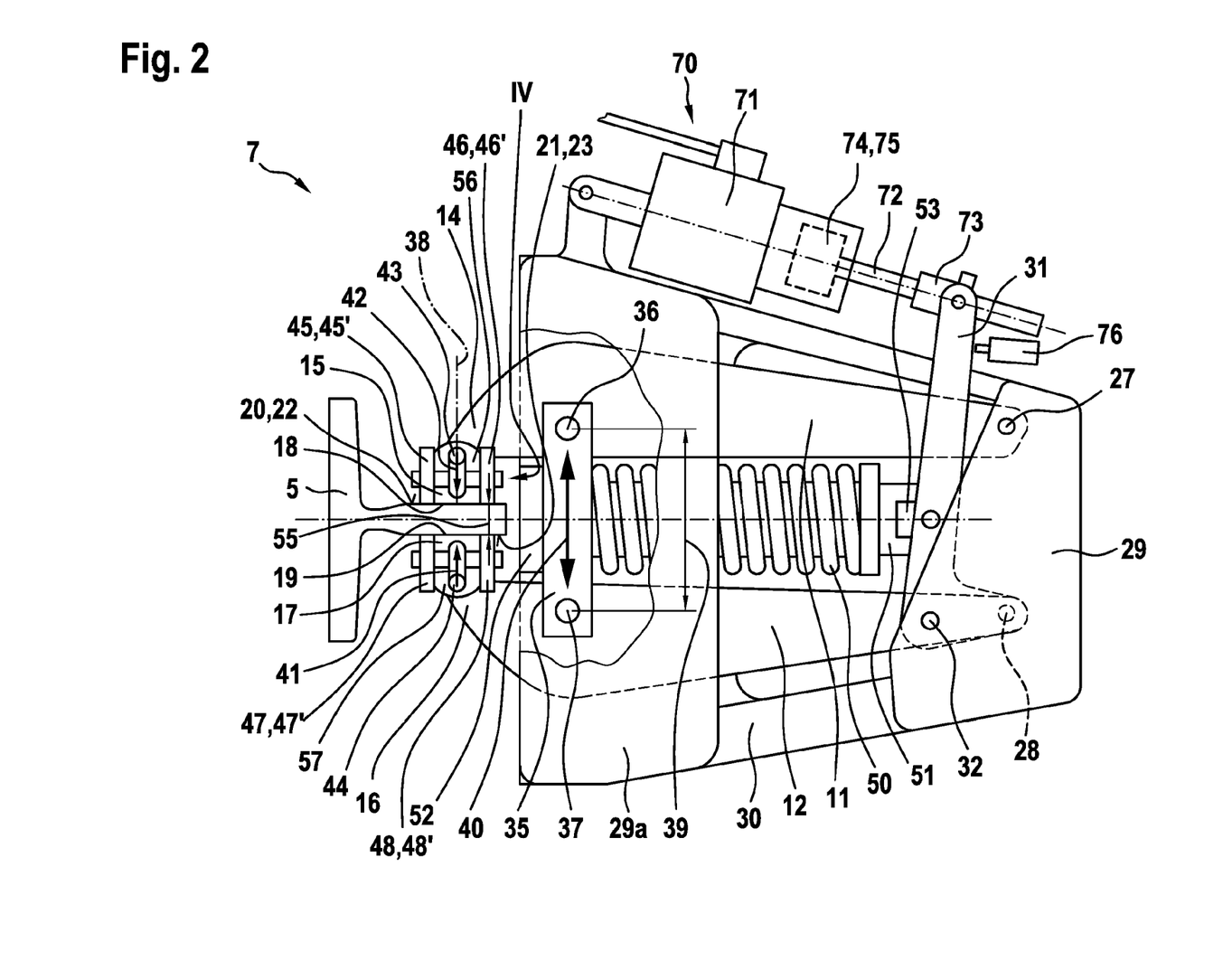
FIG. 2 shows a schematic representation of a caliper brake for the elevator system illustrated in FIG. 1 according to a first exemplary embodiment of the invention.
Figure 3:
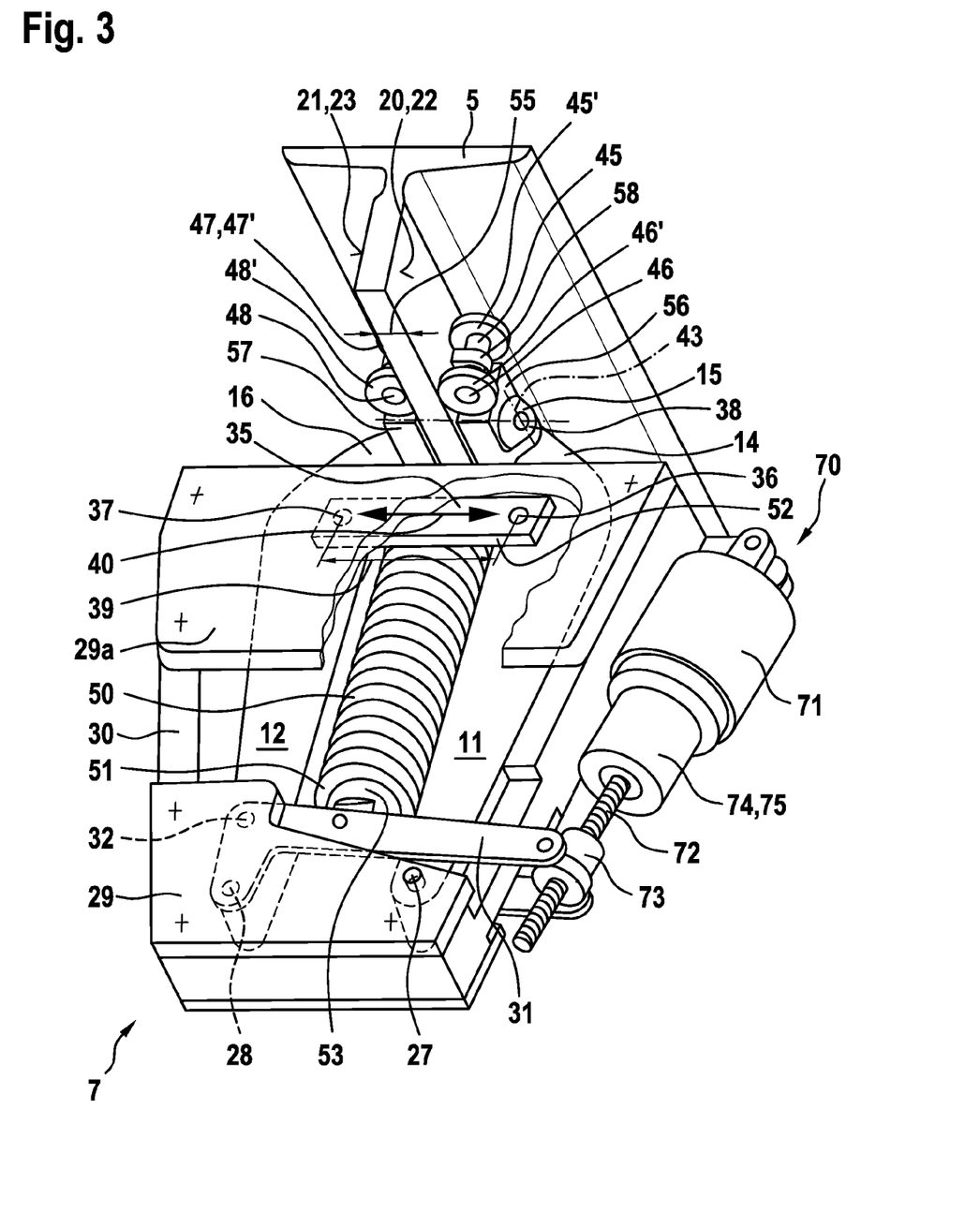
FIG. 3 shows a schematic three-dimensional representation of the caliper brake according to the first exemplary embodiment illustrated in FIG. 2.

FIG. 2 shows a schematic representation of the caliper brake 7 for the elevator system 1 illustrated in FIG. 1 according to a first exemplary embodiment of the invention. Furthermore, FIG. 3 shows a schematic three-dimensional representation of the caliper brake 7 according to the first exemplary embodiment illustrated in FIG. 2. FIGS. 2 and 3 also show the rail 5 that is rigidly arranged in the elevator shaft 4. While the elevator car 2 is in motion, the caliper brake 7 arranged on the elevator car 2 moves through the elevator shaft 4 together with the elevator car 2 and therefore relative to the rail 5.

The caliper brake 7 comprises a first brake lever 11 and a second brake lever 12. A first brake pad 15 is attached to a brake pad end 14 of the first brake lever 11. A second brake pad 17 is attached to a brake pad end 16 of the second brake lever 12. A brake lining 18 is provided on the first brake pad 15. A brake lining 19 is provided on the second brake pad 17. In the installed state, the brake lining 18 of the first brake pad 15 is assigned to a track 20 of the rail 5 that serves as a braking track 20. The brake lining 19 of the second brake pad 17 is assigned to a track 21 of the rail 5 that serves as a braking track 21. In this case, the braking tracks 20, 21 are located on opposite sides 22, 23 of the rail 5. In addition, the tracks, 20, 21 may also serve as guide tracks 20, 21 in order to ensure a guidance of the elevator car 2 in the elevator shaft 4 by means of suitable (not-shown) elevator car guide rollers.

The first brake lever 11 is rotatably mounted at a first mounting point 27. The second brake lever 12 is rotatably mounted with respect to a second mounting point 28. The first mounting point 27 is arranged in a stationary manner with respect to a rear housing part 29 of the housing 30 or the housing 30 itself. Furthermore, an intermediate lever 31 is provided and arranged at an intermediate lever mounting point 32 in a stationary manner with respect to the rear housing part 29 or the housing 30. The second brake lever 12 is mounted on the intermediate lever 31 at the second mounting point 28. In this case, the mounting of the intermediate lever 31 relative to the housing 30 at the intermediate lever mounting point 32 is realized in such a way that the mounting of the second brake lever 12 at the second mounting point 28 is not impaired. The second mounting point 28 is moved relative to the housing 30 or the rear housing part 29 when the intermediate lever 31 is rotated relative to the housing 30 about the intermediate lever mounting point 32. The rear housing part 29 is an upper part of the housing 30. For example, it is screwed to the housing 30 after the installation of the brake levers 11, 12, the intermediate lever 31 and any other required mounting elements.

The brake levers 11, 12 are connected to one another by means of a tension element 35. To this end, the first brake lever 11 is connected to the tension element 35 at a first tension element mounting point 36. In FIGS. 2 and 3, the housing 30 or a front housing part 29a respectively is partially opened in order to better illustrate the arrangement of the tension element 35. The front housing part 29a is an upper part of the housing 30 in the front brake section. Depending on the installation position of the caliper brake 7 on the elevator car, the upper part naturally may also be arranged on the bottom. The second brake lever 12 is connected to the tension element 35 at a second tension element mounting point 37. In this exemplary embodiment, the tension element mounting points 36, 37 are realized in the form of draw shackle mounting points 36, 37, which are provided on the tension element 35 in the form of a draw shackle 35 and spaced apart from one another.

Another tension element, particularly another draw shackle, may be accordingly provided and particularly arranged underneath the brake levers.

The first brake pad 15 and the second brake pad 17 can be moved relative to one another along an actuation axis 38 by means of the brake levers 11, 12. In this case, the brake levers 11, 12 are mounted in the housing 30 in a floating manner at least approximately parallel to the actuation axis 38 by means of the draw shackle 35. The tension element mounting points 36, 37 in the form of draw shackle mounting points 36, 37 are spaced apart from one another parallel to the actuation axis 38 by a distance 39. However, the distance 39 also remains constant if a movement of the draw shackle 35 parallel to the actuation axis 38 occurs during the operation as a result of the floating mounting as indicated by the double arrow 40. Consequently, the tension element 35 in the form of a draw shackle 35 allows an articulated connection of the brake levers 11, 12 such that the brake levers 11, 12 can exert pressing forces 41, 42 upon the brake pads 15, 17 against the braking tracks 20, 21 of the rail 5.

Figure 4:
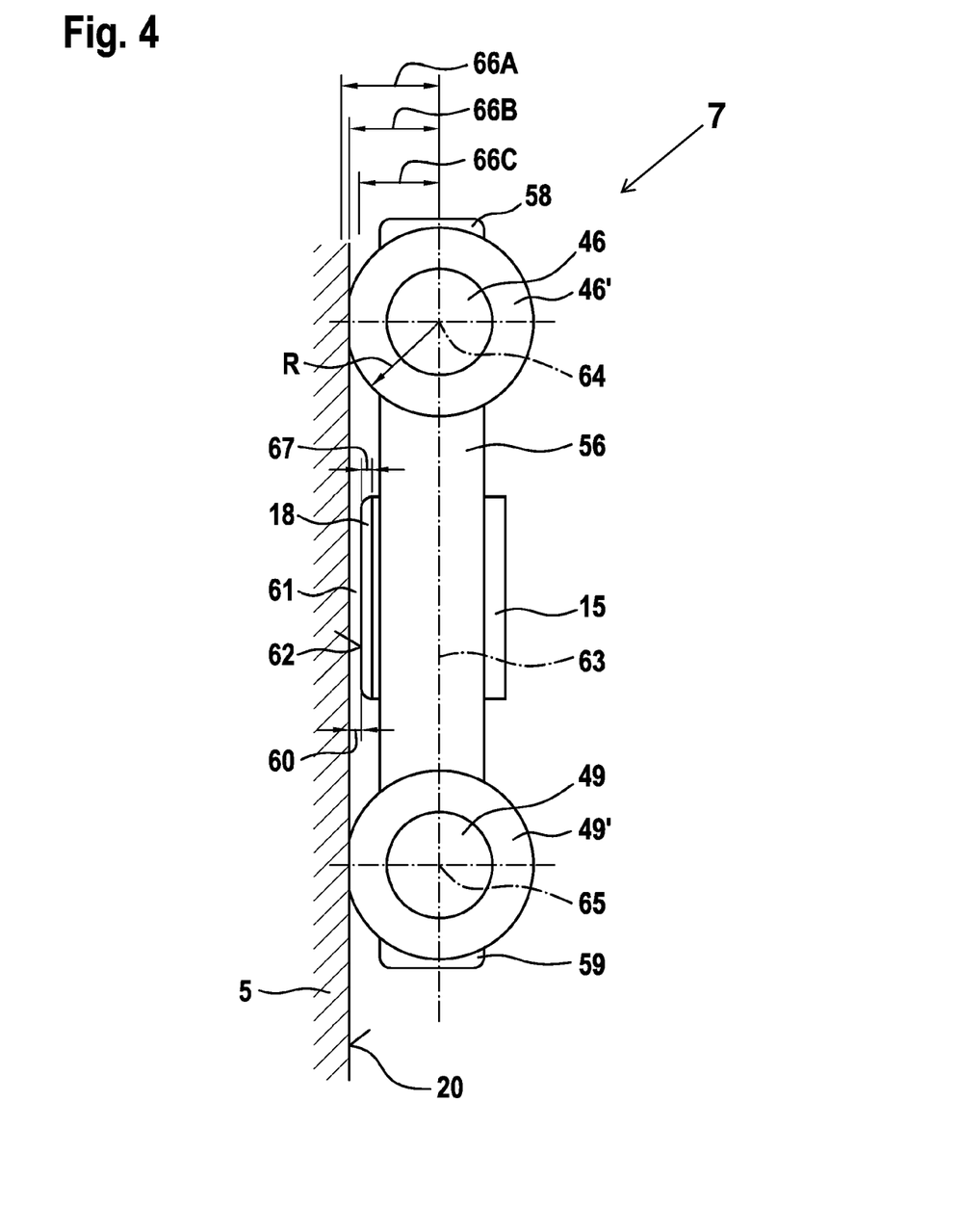
FIG. 4 shows a schematic partial illustration of the caliper brake according to the first exemplary embodiment illustrated in FIG. 2 in the region of the rail 5 from the viewing direction identified by the reference symbol IV.

The brake pads 15, 17 are mounted on the brake levers 11, 12 so as to be rotatable about axes 43, 44. The axes 43, 44 are arranged parallel to one another in this case. A ventilation clearance 60 (FIG. 4), which preferably amounts to approximately 0.25 mm, is adjusted between each of the brake linings 18, 19 of the brake pads 15, 17 and the assigned braking tracks 20, 21 when the caliper brake 7 is open. Pretensioning rollers 45 to 49 with elastic roller coatings 45' to 49' are provided in order to prevent the brake pads 15, 17 from dragging when the elevator car 2 moves through the elevator shaft 4. The first brake pad 15 is guided by the pretensioning rollers 45, 46, 49 (FIG. 4). The second brake pad 17 is guided by the pretensioning rollers 47, 48. The roller coatings 45' to 49' of the pretensioning rollers 45 to 49 are slightly pretensioned when the caliper brake 7 is open in order to achieve a sound guidance.

In this exemplary embodiment, four pretensioning rollers 45 to 49 are provided for each of the brake pads 15, 17 and respectively mounted on a guide body 56 for the first brake pad 15 and a guide body 57 for the second brake pad 17 in a rotatable manner, wherein only the pretensioning rollers 45 to 49 are illustrated.

The caliper brake 7 is closed with a closing spring 50 in the form of a pressure spring 50. The closing spring 50 is guided with a spring mounting 51. The closing spring 50 is supported on the housing 30 by means of the spring mounting 51 on one side 52 and rotatably connected to the intermediate lever 31 on the other side 53. The closing spring 50 accordingly is mounted on the housing 30 and acts upon the intermediate lever 31. During the operation, the closing spring 50 moves the first brake lever 11 and the second brake lever 12 relative to one another in order to decrease a distance 55 between the brake linings 18, 19 of the brake pads 15, 17 along the actuation axis 38. The respective ventilation clearance 60 between the brake linings 18, 19 and the braking tracks 20, 21 is thereby closed and the caliper brake 7 engages. In this exemplary embodiment, the intermediate lever 31 is still acted upon with a sufficiently high closing force if a spring fracture occurs because the closing spring 50 is for this purpose suitably supported by the spring mounting 51.

The rotational axes with respect to the mounting points 27, 28, the intermediate lever mounting point 32, the draw shackle mounting points 36, 37 and the axes 43, 44 preferably lie at least approximately parallel to one another. For example, they may be oriented vertically during the operation depending on the installation position of the caliper brake 7.

An arrangement of the closing spring 50 and the spring mounting 51 between the brake levers 11, 12 can be realized due to the distance 39 between the draw shackle mounting points 36, 37, the length of the draw shackle 35 and the design of the brake levers 11, 12. The first tension element mounting point 36 in the form of the first draw shackle mounting point 36 is located between the brake pad end 14 of the first brake lever 11 and the first mounting point 27 for the first brake lever 11. The second tension element mounting point 37 in the form of the second draw shackle mounting point 37 accordingly is located between the brake pad end 16 of the second brake lever 12 and the second mounting point 28 for the second brake lever 12.

Due to the design of the caliper brake 7, advantageous tracking of the brake pad ends 14, 16 of the brake levers 11, 12 relative to the rail 5 can be realized as indicated by the double arrow 40, e.g., when lateral movements of the elevator car 2 occur. In this case, the first mounting point 27 and the intermediate lever mounting point 32 may be stationary in the housing 30 and therefore stationary with respect to the elevator car 2. The pretensioning rollers 45 to 48 used as guide elements 45 to 48 can thereby guide the brake pads 15, 17 near the rail 5 with little force. In this way, the brake reaction time can be kept short because only a small air gap 61 (FIG. 4) with a small ventilation clearance 60 has to be respectively overcome in order to close the brake.

According to FIG. 3, the pretensioning rollers 45 to 49 can guide the brake pads 15, 17 by means of the guide bodies 56, 57. In this case, additional (not-shown) pretensioning rollers are provided and likewise mounted on the guide bodies 56, 57. For example, two additional pretensioning rollers 49 (FIG. 4) may be correspondingly mounted on the guide body 56 on an end 59 (FIG. 4) facing away from the end 58 of the guide body 56. A corresponding design with four pretensioning rollers 47, 48 is realized on the guide body 57.

FIG. 4 shows a schematic partial illustration of the caliper brake 7 according to the first exemplary embodiment illustrated in FIG. 2 in the region of the rail 5 from the viewing direction identified by the reference symbol IV. In order to simplify the illustration, this figure shows the guide body 56, on which four pretensioning rollers 45, 46, 49 are mounted, wherein only the pretensioning rollers 46, 49 are illustrated in FIG. 4. This figure furthermore shows part of the rail 5 in the region of its braking track 20, on which the pretensioning rollers 45, 46, 49 abut in this exemplary embodiment. In this case, the pretensioning rollers 45, 46, 49 mounted on the guide body 56 roll along the braking track 20 when the guide body 56 moves through the elevator shaft 4 along a longitudinal axis 63 of the guide body 56 while the elevator car 2 (FIG. 1) is in motion. This figure also shows the first brake pad 15 held by the guide body 56 whereas the connection to the first brake lever 11 is not shown in order to simplify the illustration.

The first brake pad 15 can be directly or indirectly fixed in the guide body 56 in a stationary manner, for example, when the initial installation or servicing takes place. The first brake pad 15 is installed in the guide body 56 in such a way that the brake lining 18 of the first brake pad 15 faces the braking track 20. An upper side 62 of the brake lining 18 preferably is aligned parallel to the braking track 20 in this case.

In a conceivable state during the installation of the guide body, in which the pretensioning rollers 45, 46, 49 are not yet pretensioned, but abut on the braking track 20, the braking track 20 and the longitudinal axis 63 of the guide body 56, which is oriented parallel to the braking track 20 and extends through the rotational axes 64, 65 of the pretensioning rollers, are spaced apart from one another by a distance 66A. In this exemplary embodiment, in which the pretension is applied by the elastic roller coatings 45', 46', 49', the distance 66A is identical to a radius R of the roller coatings 45', 46', 49'. The caliper brake 7 is adjusted in such a way that a desired ventilation clearance 60 results when the caliper brake 7 is open and a sufficiently high pretension is simultaneously achieved, wherein said pretension is in this exemplary embodiment generated due to a compression of the elastic roller coatings 45', 46', 49' on the braking track 20. In the installed state, the longitudinal axis 63 and the braking track 20 are therefore spaced apart by a distance 66B when the caliper brake 7 is open. The distance 66B is smaller than the distance 66A and therefore smaller than the respective radius R of the pretensioning rollers 45, 46, 49 or the roller coatings 45', 46', 49' in this exemplary embodiment. When the caliper brake is closed, the longitudinal axis 63 and the upper side 62 of the brake lining 18 are spaced apart by a distance 66C.

When the caliper brake 7 is closed, the first brake pad 15, which is rigidly mounted in the guide body 56, is moved closer to the braking track 20 together with the guide body 56 until the brake lining 18 abuts on the braking track 20. The ventilation clearance 60 is thereby closed. When the caliper brake 7 is opened again, the longitudinal axis 63 and the braking track 20 are once again spaced apart by the distance 66B such that a defined ventilation clearance 60 is adjusted when the caliper brake 7 is open. The distances 66B, 66C gradually decrease as the brake lining 18 wears down during the operation whereas the ventilation clearance 60 remains at least approximately constant regardless of a remaining brake lining thickness 67 of the brake lining 18.

The adjustment between the braking track 20 and the first brake pad 15 on the side 22 of the rail 5, which was described above with reference to FIG. 4 and is carried out during the installation, as well as the resulting functionality during the operation, applies accordingly to the adjustment between the braking track 21 and the second brake pad 17 on the side 23 of the rail 5. In this case, the resulting ventilation clearances 60 between the braking track 20 and the first brake pad 15 and between the braking track 21 and the second brake pad 17 preferably are at least approximately identical when the caliper brake 7 is open.

According to FIGS. 2 and 3, the caliper brake 7 comprises a linear spindle drive 70, by means of which the first brake lever 11 and the second brake lever 12 can be moved relative to one another in order to change the distance 55 between the first brake pad 15 and the second brake pad 17 along the actuation axis 38. In this case, the linear spindle drive 70 counteracts the closing spring 50 in order to increase the distance 55 between the first brake pad 15 and the second brake pad 17. The closing spring 50 moves the first brake lever 11 and the second brake lever 12 by means of the intermediate lever 31 in order to decrease the distance 55 between the first brake pad 15 and the second brake pad 17. The linear spindle drive 70 comprises a motor 71 and a threaded spindle 72. The threaded spindle 72 preferably is realized in the form of a ball screw spindle 72. In this case, the threaded spindle 72 is rotatably guided in a threaded nut 73, which is preferably realized in the form of a ball screw nut 73.

The motor 71 acts upon the first brake lever 11 and the second brake lever 12 via the threaded spindle 72, the threaded nut 73 and the intermediate lever 31 connected to the threaded nut 73 when the motor 71 counteracts the closing spring 50 in order to increase the distance 55 between the first brake pad 15 and the second brake pad 17. In this case, the threaded spindle 72 is realized in such a way that no self-locking effect occurs on the threaded spindle 72. To this end, the thread of the threaded spindle 72 and the thread of the threaded nut 73 particularly may have a sufficiently high pitch in order to reliably prevent any self-locking effect. The caliper brake 7 therefore can be opened by the motor 71 that drives the threaded spindle 72. The force of the closing spring 50, a resulting lever transmission and the thread pitch of the threaded spindle 72 define the motor size of the motor, which preferably is chosen as small as possible.

The motor 71 may be connected to the threaded spindle 72 by a freewheel 74. The motor 71 can then be switched off when the caliper brake 7 is closed and driven by the closing spring 50 via the intermediate lever 31 and the threaded spindle 72, wherein the caliper brake 7 is closed. Once the caliper brake 7 is closed, the threaded spindle 72 is abruptly decelerated and the motor 71 is decoupled by means of the freewheel 74. The motor 71 continues to run due to its inertia and is subsequently decelerated as a result of friction.

A switchable clutch 75 may also be arranged between the motor 71 and the threaded spindle 72 instead of the freewheel 74. Depending on the specific application, the switchable clutch 75 can be advantageously used for additionally reducing the closing time of the caliper brake 7.

The nominal torque of the motor 71 may, if applicable, also be significantly exceeded because only a few revolutions of the threaded spindle 72 preferably are required for opening the caliper brake 7 and opening of the caliper brake therefore may only take fractions of a second. In a potential embodiment, a torque, which has to be permanently generated by the motor 71, may be required for holding open the caliper brake 7. In this case, the motor 71 may be dimensioned in such a way that it can permanently generate this torque. A certain number of revolutions of the threaded spindle 72 preferably is predefined in order to open the caliper brake 7. The motor is then controlled in such a way that it carries out a certain number of revolutions in order to open the caliper brake 7 and then comes to a standstill. This number of revolutions may or may not be an integral number. Consequently, at least approximately the same ventilation clearance 60 is always adjusted after the caliper brake 7 has been opened starting from a closed position, in which the brake pads 15, 17 abut on their braking tracks 20, 21. In this case, the absolute rotational position shifts with the attrition of the brake linings 18, 19. The attrition can be monitored with an attrition indicator switch 76. For example, the intermediate lever 31 may actuate the attrition indicator switch 76 once a predefined attrition of the brake linings 18, 19 is reached. When the attrition indicator switch 76 is actuated, the elevator system 1 is shut down until the respective brake linings 18, 19 or brake pads 15, 17 have been replaced.

Consequently, the linear spindle drive 70 may be realized in such a way that the distance 55 between the first brake pad 15 and the second brake pad 17 is readjusted as the attrition of the brake linings 18, 19 progresses. In this way, the same ventilation clearance 60 and therefore an at least essentially constant, short closing time are always achieved when the caliper brake is opened.

The threaded nut 73 is rotatably connected to the intermediate lever 31 in this exemplary embodiment.

Figure 5:
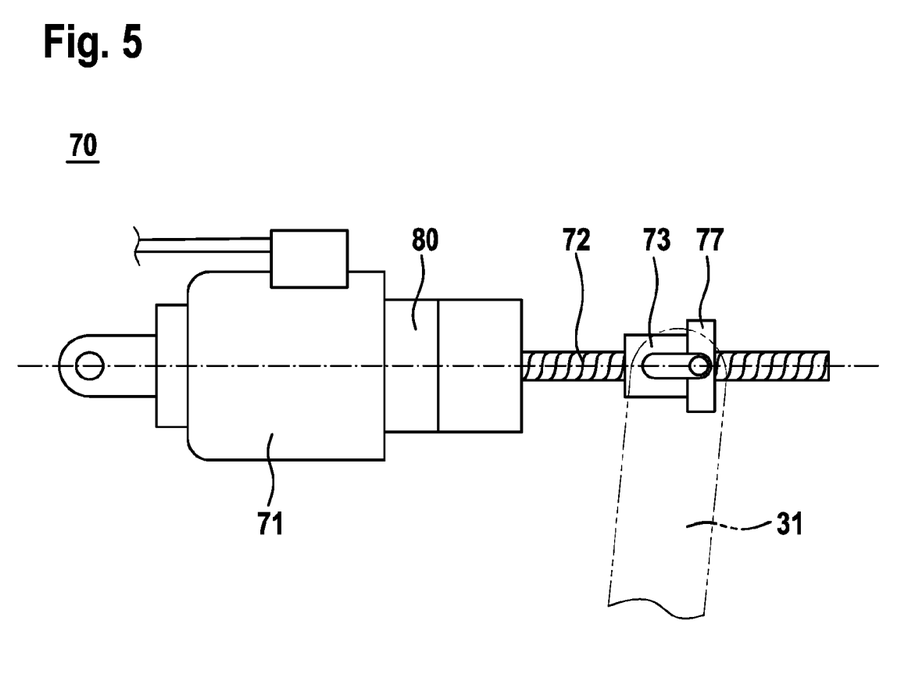
FIG. 5 shows a linear spindle drive for the caliper brake illustrated in FIG. 2 according to a second exemplary embodiment of the invention.

FIG. 5 shows a linear spindle drive 70 for the caliper brake 7 illustrated in FIG. 2 according to a second exemplary embodiment. The threaded nut 73 is decoupled from the intermediate lever 31 by a linear freewheel 77 in this exemplary embodiment. An abrupt deceleration of the motor 71 can thereby be prevented. The deceleration of the motor 71 then takes place, for example, as a result of spring force and friction.

In a modified embodiment, the motor 71 may be equipped with a holding brake 80. In this case, the function of the motor 71 may especially be adapted to opening the caliper brake 7. For example, the holding brake 80 can be closed once the motor 71 has turned the threaded spindle 72 by a predefined number of revolutions in order to open the caliper brake 7. In this way, the caliper brake 7 can be held open without the motor 71 having to permanently generate a torque for holding open the caliper brake 7. The holding brake 80 therefore holds the threaded spindle 72 in a fixed position during the operation. The motor 71 may then only be required for actuating the caliper brake 7. In this case, the motor 71 may, if applicable, not only be used for opening the caliper brake 7, but also for closing the caliper brake 7 in a controlled manner.

The invention is not limited to the described embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A caliper brake for engaging a rail in an elevator shaft of an elevator system, the caliper brake comprising:
   a first brake lever having a first brake pad attached to a brake pad end of the first brake lever;
   a second brake pad having a second brake pad attached to a brake pad end of the second brake lever;
   wherein the first brake lever is rotatably mounted at a first mounting point and the second brake lever is rotatably mounted at a second mounting point, and wherein the first brake pad and the second brake pad are movable by the first brake lever and the second brake lever relative to one another along an actuation axis;
   a tension element movable parallel to the actuation axis and having a first tension element mounting point and a second tension element mounting point, wherein a distance between the first tension element mounting point and the second tension element mounting point along the actuation axis is constant;
   wherein the first brake lever is connected to the tension element between the brake pad end of the first brake lever and the first mounting point at the first tension element mounting point, and wherein the second brake lever is connected to the tension element between the brake pad end of the second brake lever and the second mounting point at the second tension element mounting point; and
   wherein the first mounting point is arranged stationary with respect to a housing part, including an intermediate lever mounted at an intermediate lever mounting point, wherein the intermediate lever mounting point is arranged stationary with respect to the housing part, wherein the second brake lever is mounted on the intermediate lever at the second mounting point, and wherein the second mounting point is movable relative to the housing part during a rotation of the intermediate lever about the intermediate lever mounting point.

2. The caliper brake according to claim 1 wherein the first tension element mounting point and the second tension element mounting point are spaced apart from one another parallel to the actuation axis.

3. The caliper brake according to claim 1 including a closing spring adapted to move the first brake lever and the second brake lever relative to one another to decrease a distance between the first brake pad and the second brake pad along the actuation axis, and wherein the closing spring is arranged between the first brake lever and the second brake lever.

4. The caliper brake according to claim 1 wherein at least one of the first brake pad is rotatable about an axis on the first brake lever and the second brake pad is rotatable about an axis on the second brake lever.

5. The caliper brake according to claim 1 wherein at least one of the first brake lever and the second brake lever has a pretensioning roller mounted thereon, wherein when the pretensioning roller is mounted on the first brake lever adjacent the first brake pad and the caliper brake is in an open state the pretensioning roller provides a ventilation clearance between the first brake pad and a braking track for the first brake pad on the rail, and wherein when the pretensioning roller is mounted on the second brake lever adjacent the second brake pad and the caliper brake is in an open state the pretensioning roller provides a ventilation clearance between the second brake pad and a braking track for the second brake pad on the rail.

6. The caliper brake according to claim 5 wherein the pretensioning roller has an elastic roller coating that is pretensioned relative to one of the braking tracks when the caliper brake is in the open state.

7. An elevator system comprising an elevator car and at least one caliper brake according to claim 1 arranged on the elevator car.

8. A caliper brake for engaging a rail of an elevator system, the caliper brake comprising:
   a first brake lever and a second brake lever;
   a first brake pad attached to a brake pad end of the first brake lever and a second brake pad attached to a brake pad end of the second brake lever;
   wherein the first brake lever is mounted at a first mounting point, the second brake lever is mounted at a second mounting point, and the first brake pad and the second brake pad are movable relative to one another along an actuation axis by the first brake lever and the second brake lever;
   a linear spindle drive for moving the first brake lever and the second brake lever relative to one another to change a distance between the first brake pad and the second brake pad along the actuation axis;
   a closing spring moving the first brake lever and the second brake lever relative to one another to decrease the distance between the first brake pad and the second brake pad, wherein the linear spindle drive operates to counteract the closing spring to increase the distance between the first brake pad and the second brake pad;
   wherein the linear spindle drive includes a motor and a threaded spindle, the motor acting upon the first brake lever and the second brake lever via the threaded spindle to counteract the closing spring to increase the distance between the first brake pad and the second brake pad, and wherein the threaded spindle is configured to prevent a self-locking effect on the threaded spindle; and
   including a housing and an intermediate lever, wherein the motor acts upon the intermediate lever via the threaded spindle when the motor counteracts the closing spring to increase the distance between the first brake pad and the second brake pad, the closing spring is supported on the housing and is connected to the intermediate lever, and the threaded spindle is connected to the intermediate lever by a linear freewheel.

9. The caliper brake according to claim 8 wherein the linear spindle drive is a ball screw spindle.

10. The caliper brake according to claim 8 wherein the motor is connected to the threaded spindle by a freewheel or by a switchable clutch.

11. The caliper brake according to claim 8 including a holding brake cooperating with the motor to at least partially relieve the motor from generating torque in an open state of the caliper brake.

12. The caliper brake according to claim 8 wherein the linear spindle drive operates to readjust the distance between the first brake pad and the second brake pad as attrition of brake linings of the first brake pad and the second brake pad progresses, and including an attrition indicator switch actuated by the linear spindle drive in response to reaching a predefined attrition of the brake linings.

13. The caliper brake according to claim 8 wherein the linear spindle drive operates such that an increase of the distance between the first brake pad and the second brake pad from a closed state of the caliper brake into an open state of the caliper brake occurs with a predefined number of revolutions of the linear spindle drive.

14. An elevator system comprising an elevator car and at least one caliper brake according to claim 8 arranged on the elevator car.

15. A caliper brake for engaging a rail in an elevator shaft of an elevator system, the caliper brake comprising:
- a first brake lever having a first brake pad attached to a brake pad end of the first brake lever;
- a second brake pad having a second brake pad attached to a brake pad end of the second brake lever;
- wherein the first brake lever is rotatably mounted at a first mounting point and the second brake lever is rotatably mounted at a second mounting point, and wherein the first brake pad and the second brake pad are movable by the first brake lever and the second brake lever relative to one another along an actuation axis;
- a tension element movable parallel to the actuation axis and having a first tension element mounting point and a second tension element mounting point, wherein a distance between the first tension element mounting point and the second tension element mounting point along the actuation axis is constant;
- wherein the first brake lever is connected to the tension element between the brake pad end of the first brake lever and the first mounting point at the first tension element mounting point, and wherein the second brake lever is connected to the tension element between the brake pad end of the second brake lever and the second mounting point at the second tension element mounting point; and
- wherein at least one of the first brake lever and the second brake lever has a pretensioning roller mounted thereon, wherein when the pretensioning roller is mounted on the first brake lever adjacent the first brake pad and the caliper brake is in an open state the pretensioning roller provides a ventilation clearance between the first brake pad and a braking track for the first brake pad on the rail, and wherein when the pretensioning roller is mounted on the second brake lever adjacent the second brake pad and the caliper brake is in an open state the pretensioning roller provides a ventilation clearance between the second brake pad and a braking track for the second brake pad on the rail.

* * * * *